United States Patent
Yamaguchi et al.

(10) Patent No.: US 9,525,739 B2
(45) Date of Patent: Dec. 20, 2016

(54) FA NETWORK LSI AND COMMUNICATION DEVICE

(71) Applicant: Mitsubishi Electric Corporation, Tokyo (JP)

(72) Inventors: Tomohisa Yamaguchi, Tokyo (JP); Shuya Sano, Tokyo (JP); Hisafumi Komoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/787,845

(22) PCT Filed: May 9, 2013

(86) PCT No.: PCT/JP2013/063056
§ 371 (c)(1),
(2) Date: Oct. 29, 2015

(87) PCT Pub. No.: WO2014/181428
PCT Pub. Date: Nov. 13, 2014

(65) Prior Publication Data
US 2016/0112519 A1    Apr. 21, 2016

(51) Int. Cl.
*G06F 15/16* (2006.01)
*H04L 29/08* (2006.01)
*H04L 29/06* (2006.01)

(52) U.S. Cl.
CPC ............. *H04L 67/125* (2013.01); *H04L 67/12* (2013.01); *H04L 69/12* (2013.01); *H04L 69/324* (2013.01)

(58) Field of Classification Search
CPC ...... H04L 67/125; H04L 67/12; H04L 69/324; H04L 69/12
See application file for complete search history.

(56) References Cited

U.S. PATENT DOCUMENTS

| 5,408,661 A | 4/1995 | Kuranaga |
| 2003/0207698 A1 | 11/2003 | Shpak |

(Continued)

FOREIGN PATENT DOCUMENTS

| JP | 5-95385 A | 4/1993 |
| JP | 6-309251 A | 11/1994 |

(Continued)

OTHER PUBLICATIONS

International Search Report of PCT/JP2013/063056 dated Jul. 30, 2013.

(Continued)

*Primary Examiner* — John B Walsh
(74) *Attorney, Agent, or Firm* — Sughrue Mion, PLLC; Richard C. Turner (57) ABSTRACT

An FA network LSI is provided in a communication device performing a communication process in a network layer or higher through a plurality of protocols. The FA network LSI includes a data-link layer processing unit that performs a process in a data link layer for control data, and a protocol processing unit that performs a process in the network layer or higher for the control data. The data-link layer processing unit includes a first data-link layer processing unit to process dedicatedly to correspond to a protocol required high speed processing, a second data-link layer processing unit to process in a standard data link layer, for a protocol other than the protocol required the high speed processing, and a data-link-layer-processing selection unit to select one of the two units mentioned-above. The data-link layer processing unit is formed by hardware.

14 Claims, 6 Drawing Sheets

(56) References Cited

U.S. PATENT DOCUMENTS

| | | |
|---|---|---|
| 2005/0054370 A1 | 3/2005 | Shpak |
| 2007/0230493 A1 | 10/2007 | Dravida et al. |
| 2007/0250182 A1* | 10/2007 | Demachi ........... H04L 12/40143 700/9 |
| 2008/0270360 A1 | 10/2008 | Nagoya |
| 2012/0236789 A1 | 9/2012 | Dravida et al. |
| 2014/0237036 A1* | 8/2014 | Tanimoto .............. H04L 67/025 709/203 |

FOREIGN PATENT DOCUMENTS

| | | |
|---|---|---|
| JP | 2000-235536 A | 8/2000 |
| JP | 2004-032004 A | 1/2004 |
| JP | 2004-064335 A | 2/2004 |
| JP | 2006-503479 A | 1/2006 |
| JP | 2006-238377 A | 9/2006 |
| JP | 2007-201785 A | 8/2007 |
| JP | 2010-206241 A | 9/2010 |
| JP | 2010-278897 A | 12/2010 |
| JP | 2012-54932 A | 3/2012 |
| WO | 2006/087832 A1 | 8/2006 |

OTHER PUBLICATIONS

Japanese Office Action of Corresponding Japanese Application No. 2015-515697 issued Jun. 5, 2015.
Japanese Written Opinion of PCT/JP2013/063056 dated Jul. 30, 2013.

* cited by examiner

| DESTINATION ID | DESTINATION MAC ADDRESS | PROTOCOL |
|---|---|---|
| SLAVE 20-1 | xx:xx:xx:xx:xx:xx | HIGH SPEED PROTOCOL |
| SLAVE 20-2 | xx:xx:xx:xx:xx:xx | LOW SPEED PROTOCOL |
| ⋮ | ⋮ | ⋮ |
| SLAVE 20N-1 | xx:xx:xx:xx:xx:xx | HIGH SPEED PROTOCOL |
| SLAVE 20N | xx:xx:xx:xx:xx:xx | LOW SPEED PROTOCOL |

FA NETWORK LSI AND COMMUNICATION DEVICE

CROSS REFERENCE TO RELATED APPLICATIONS

This application is a National Stage of International Application No. PCT/JP2013/063056 filed May 9, 2013, the contents of all of which are incorporated herein by reference in their entirety.

FIELD

The present invention relates to an FA (Factory Automation) network LSI (Large Scale Integrated circuit) and a communication device.

BACKGROUND

There is a demand from FA device manufacturers to support a plurality of FA network protocols with the same hardware (hereinafter, H/W), and LSIs that support Ethernet®-based multiple protocols are going into markets. An invention of an LSI that supports multiple protocols has been proposed for a digital multifunction machine, which is not however for an FA device (see, for example, Patent Literature 1). The Patent Literature 1 discloses a multifunction device including a network LSI that can process a high speed connection separately from a low speed connection. When an application requests a high speed connection, the multifunction machine assigns the process to the high speed connection of the network LSI and executes a TCP (Transmission Control Protocol)/IP (Internet Protocol) protocol by H/W processing. Meanwhile, when the application requests a low speed connection, the multifunction machine assigns the process to the low speed connection and performs software (hereinafter, S/W) processing of the TCP/IP protocol in a TCP/IP processing unit that is not the network LSI, without performing the TCP/IP process in the network LSI.

CITATION LIST

Patent Literature

Patent Literature 1: Japanese Patent Application Laid-open No. 2007-201785

SUMMARY

Technical Problem

However, the conventional network LSI distinguishes whether to use the high speed connection or the low speed connection for processes in the network layer or higher layers, as described in Patent Literature 1, and no proposal has been conventionally made for distinguishing processes in a datalink layer or lower layers. Further, Patent Literature 1 is directed to general networks, but does not relate to a communication device that requires real-time properties, such as FA networks.

The present invention has been made to solve the problems above, and an object of the present invention is to provide an FA network LSI and a communication device that can perform communication via any protocol without changing the FA network LSI, under an FA network environment where a plurality of protocols may be possibly used in a data link layer.

Solution to Problem

In order to achieve the objective above, the present invention relates to an FA network LSI used in an FA system in which a plurality of communication devices are connected via a network, and incorporated in the communication device capable of performing a communication process in a network layer or higher via a plurality of protocols. The FA network LSI includes: a data-link layer processing unit that performs a process in a data link layer for control data communicated with the network; and a protocol processing unit that performs a process in a network layer or higher for the control data. The data-link layer processing unit includes a first data-link layer processing unit that performs a first data-link layer process in the data link layer defined dedicatedly to correspond to a protocol for which high speed processing is required, a second data-link layer processing unit that performs a second data-link layer process in a standard data link layer for a protocol other than the protocol for which the high speed processing is required, and a data-link-layer-processing selection unit that selects one of the first data-link layer processing unit and the second data-link layer processing unit in accordance with a predetermined criterion for transmitted control data or received control data. The data-link layer processing unit is formed by hardware.

Advantageous Effects of Invention

According to the present invention, a MAC processing unit of an FA network LSI includes a dedicated MAC processing unit and a standard MAC processing unit that are formed by H/W, and is configured in such a manner that one of the MAC processing units selected in advance is used. Therefore, whether a protocol actually used in an FA network that can use both a high speed protocol and a low speed protocol is the high speed protocol or the low speed protocol, it is possible to statically process the actually used protocol with a single FA network LSI. Further, it is possible to reduce the cost of an FA network-supporting device that supports a plurality of FA network protocols including high speed protocol.

DESCRIPTION OF EMBODIMENTS

Exemplary embodiments of an FA network LSI and a communication device according to the present invention will be explained below in detail with reference to the accompanying drawings. The present invention is not limited to the embodiments. In the following descriptions, configurations and problems of a general FA network LSI are explained before explaining embodiments of the present invention.

Conventional LSIs supporting multiple protocols include a CPU (Central Processing Unit) for executing S/W that performs a protocol process in a network layer or higher layers and a standard MAC (Media Access Control) processing unit that conforms to the Ethernet® standard and performs a process in a data link layer in one chip (and may also include a PHY processing unit that performs a process in a physical layer). These LSIs process multiple protocols by replacing with the S/W that performs the protocol process in the network layer or higher.

In an FA network, processes can be divided into two: one is required real-time properties and the other required not. In the former type, high speed in the processing is necessary to satisfy the real-time properties. In the latter type, however, the processing may be performed at a lower speed to satisfy the real-time properties. Therefore, a high speed protocol can be defined to perform a high speed processing that achieves real-time properties for the processes requiring real-time properties. A low speed protocol can be defined to perform a processing at a lower speed than the processing of the high speed protocol, not being required real-time properties.

In a standard MAC, because a portion of a high speed protocol process has to be performed at outside according to the specification of the standard MAC, the processing speed is reduced because of overhead or the like even if a portion of the protocol process is performed by H/W. Therefore, the high speed protocol cannot be achieved in a conventional LSI supporting multiple protocol that uses the standard MAC. So, in a case where the network layer or higher uses the high speed protocol, without using the standard MAC generally used in the data link layer, a data link layer can be provided with that can more promptly process a portion of the protocol processing than the standard MAC (hereinafter, "dedicated MAC"), which can perform higher processing. This dedicated MAC achieves higher speed processing than the standard MAC by omitting the portion described above, which performs the portion of the protocol process in the standard MAC at outside.

However, in order to handle a plurality of protocols including a high speed protocol, an LSI for a plurality of protocols (for a low speed protocol) capable of operating in a standard MAC and an LSI for the high speed protocol are required. That is, two or more LSIs are required. Therefore, there is a problem of an increased cost of an FA network-supporting device that supports a plurality of FA network protocols including the high speed protocol.

The following embodiments are described about a network LSI and a communication device that can handle a high speed protocol and a low speed protocol with a single LSI or a single device.

First Embodiment

Figure 1:
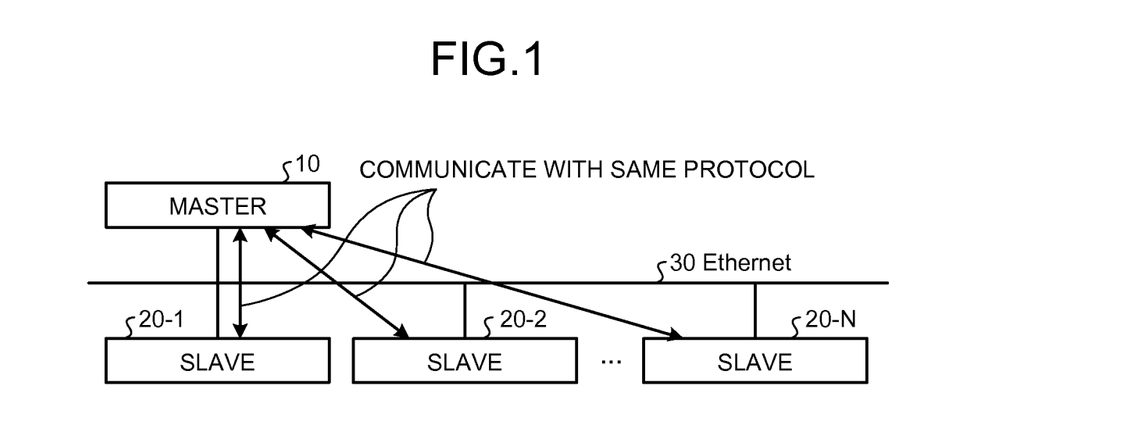
FIG. 1 is a diagram schematically illustrating an example of a configuration of an FA network system according to a first embodiment.

FIG. 1 is a diagram schematically illustrating an example of a configuration of an FA network system according to a first embodiment. The FA network system includes a master 10 that is a communication device included in a programmable controller or the like and slaves 20-1 to 20-N that are communication devices included in an I/O (Input/Output) device or the like, which are connected via a transmission path (network) 30 to each other. In the following embodiments, a case where the Ethernet® is used as the transmission path 30 is described as an example.

In the FA network system, the master 10 sends a control command to the slaves 20-1 to 20-N through the transmission path 30, and the slaves 20-1 to 20-N perform a process in response to this control command and return a result to the master 10. This communication is regularly repeated and requires real-time properties. It is assumed that communications between the master 10 and the slaves 20-1 to 20-N are performed on a single protocol in this FA network system.

Figure 2:
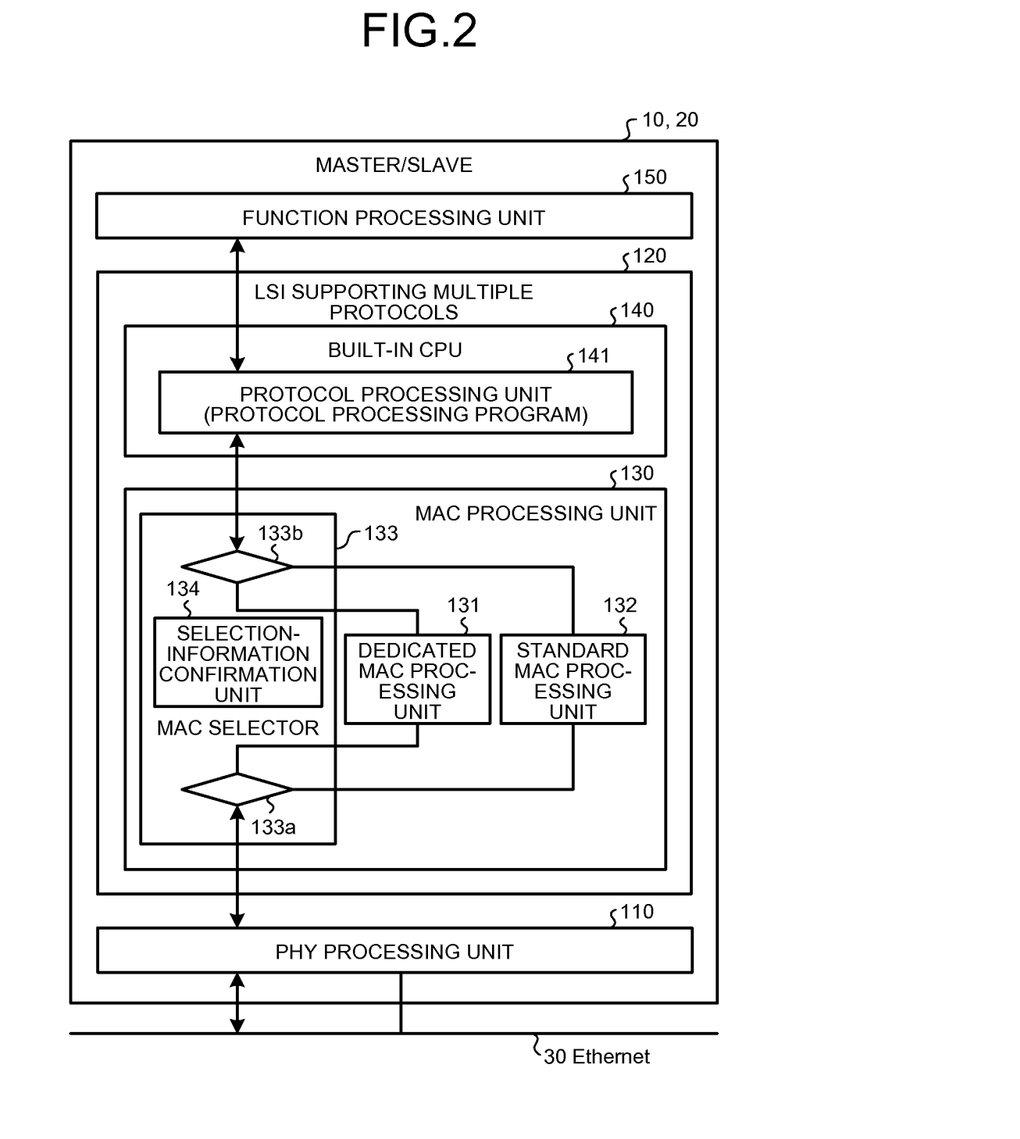
FIG. 2 is a block diagram schematically illustrating a configuration of a master and a slave according to the first embodiment.

FIG. 2 is a block diagram schematically illustrating a configuration of a master and a slave according to the first embodiment. The master 10 and the slave 20 include a PHY processing unit 110 that is a physical-layer processing unit and that realizes standard processing in a physical layer of the transmission path 30 (the Ethernet®); an LSI 120 supporting multiple protocols that is an FA network LSI and that supports a plurality of FA network protocols; and a function processing unit 150 that is a function processing unit and that carries out functions of the master 10 or the slave 20 as the communication device. The function carried out by the function processing unit 150 is, for example, a control of the slave 20 by a control program in a case where the master 10 is a controller; and is an input/output operation with the outside by an external output circuit in a case where the slave 20 is the I/O device. Note that the function processing unit 150 of the master 10 processes by S/W and the function processing unit 150 of the slave 20 processes by H/W in the example described here; however the function processing unit 150 may process by any of S/W and H/W irrespective whether it is the master 10 or the slave 20.

The LSI 120 supporting multiple protocols includes a MAC processing unit 130 that is a data-link layer processing unit and that realizes processes in the data link layer of the transmission path 30; and a built-in CPU 140 that is a protocol processing unit.

The MAC processing unit 130 includes a dedicated MAC processing unit 131 as a first data-link layer processing unit that performs processes in the data link layer by an dedicated MAC having a speed-up function incorporated therein for realizing a high speed protocol; a standard MAC processing unit 132 as a second data-link layer processing unit that performs processes in the data link layer by a standard MAC used in a low speed protocol; and a MAC selector 133 as a data-link-layer-processing selection unit that selects which one of the dedicated MAC processing unit 131 and the standard MAC processing unit 132 to use.

The dedicated MAC processing unit 131 and the standard MAC processing unit 132 are configured to be able to perform communication processes corresponding to the dedicated MAC and the standard MAC, respectively, by H/W. The MAC selector 133 includes a selector 133a positioned on the side of the PHY processing unit 110 and a selector 133b positioned on the side of the built-in CPU 140; and a selection-information confirmation unit 134 that confirms selection information for selecting which one of the dedicated MAC processing unit 131 and the standard MAC processing unit 132 to use when the master 10 or the slave 20 is activated and that sets the selectors 133a and 133b according to the confirmed selection information.

The built-in CPU 140 includes a protocol processing unit 141 that reads a protocol processing program for performing a protocol process in the network layer or higher and performs the protocol process. It is possible to handle the high speed protocol and a plurality of low speed protocols by changing this protocol processing program.

Furthermore, in the first embodiment, only one system of interface is provided, which is an interface of the MAC processing unit 130 (an interface on each of the PHY processing unit 110 and the built-in CPU 140). This configuration can reduce the number of external circuits and can achieve reduction in the device cost.

In this manner, in the LSI 120 supporting multiple protocols according to the first embodiment, the dedicated MAC is defined in which the processing speed of the standard MAC is increased so as to realize a high speed protocol; and the dedicated MAC processing unit 131 for processing this dedicated MAC and the standard MAC processing unit 132 for processing the standard MAC used in a low speed protocol other than the high speed protocol are provided, which are switched by the MAC selector 133. As a result, it is possible to increase a speed of a process of selection between the dedicated MAC and the standard MAC.

Next, processes of transmitting and receiving control data in the communication device configured as described above are described with reference to FIG. 2.

(1) Transmission Process of Control Data

First, when the master 10 or the slave 20 is activated, the selection-information confirmation unit 134 of the MAC selector 133 of the master 10 or the slave 20 confirms selection information such as a setting switch or a setting file that has been set in accordance with a protocol of the FA network or a setting when being shipped, and switches the selectors 133*a* and 133*b* according to the selection information. When the selectors 133*a* and 133*b* are set first, change of the selection does not occur thereafter.

Subsequently, control data that is a result of execution in the function processing unit 150 is processed by the protocol processing unit 141 of the built-in CPU 140 according to the protocol processing program. The protocol processing unit 141 sends the control data to the MAC processing unit 130 in accordance with a protocol defined in the protocol processing program.

The MAC processing unit 130 then processes the control data according to the Ethernet® standard using the dedicated MAC processing unit 131 or the standard MAC processing unit 132 in accordance with the content of the selection first set by the MAC selector 133, and thereafter it sends the processed control data to the PHY processing unit 110. The PHY processing unit 110 transmits the control data to the transmission path 30 according to the Ethernet® standard.

(2) Reception Process of Control Data

Similar to the transmission process, in a reception process, when the master 10 or the slave 20 is activated, the selection-information confirmation unit 134 of the MAC selector 133 of the master 10 or the slave 20 confirms the selection information and performs switching of the selectors 133*a* and 133*b* on the basis of the selection information. After the selectors 133*a* and 133*b* are set first, change of the selection does not occur thereafter.

Upon reception of the control data from the transmission path 30, the PHY processing unit 110 sends the received control data to the MAC processing unit 130. In the MAC processing unit 130, the control data is sent to the dedicated MAC processing unit 131 or the standard MAC processing unit 132 that is selected by the MAC selector 133 when the master 10 or the slave 20 is activated.

In a case where the selected MAC is the standard MAC processing unit 132, the standard MAC processing unit 132 checks a MAC address of the control data. The standard MAC processing unit 132 sends the control data to the built-in CPU 140 when the MAC address is an address of its own station, and discards the control data when the MAC address is not the one of its own station. Further, when the MAC address is a broadcast address or a multicast address, the standard MAC processing unit 132 sends the control data to the built-in CPU 140.

Meanwhile, in a case where the selected MAC is for the dedicated MAC processing unit 131, the dedicated MAC processing unit 131 checks the MAC address of the control data. When the MAC address is for the one of its own station, the dedicated MAC processing unit 131 checks the control data and performs a process necessary for the high speed protocol, and when the control data is necessary for its own station, it sends the control data to the built-in CPU 140. When the control data is not needed for its own station, the dedicated MAC processing unit 131 discards the control data. When the MAC address is not for the one of its own station, the dedicated MAC processing unit 131 also discards the control data.

Thereafter, when the protocol processing unit 141 of the built-in CPU 140 receives the control data from the dedicated MAC processing unit 131 or the standard MAC processing unit 132, the protocol processing unit 141 performs a necessary protocol process in accordance with the protocol processing program. The protocol processing unit 141 sends the control data to the function processing unit 150, and the function processing unit 150 performs a predetermined process using the control data.

In the first embodiment, the dedicated MAC processing unit 131 and the standard MAC processing unit 132 that are formed by H/W are provided in the MAC processing unit 130 of the LSI 120 supporting multiple protocols, and they are configured so that one of them selected in advance is used. Due to this configuration, whether the protocol actually used in the FA network, in which the high speed protocol and the low speed protocol can be used, is the high speed protocol or the low speed protocol, it is possible to statically handle the actually used protocol with a single LSI 120 that supports multiple protocols. Further, each of the both interfaces of the MAC processing unit 130 having the dedicated MAC processing unit 131 and the standard MAC processing unit 132 facing the PHY processing unit 110 and facing the built-in CPU 140 thereof is configured to be one system. Therefore, it is possible to reduce the number of components and the cost in an FA network supporting device.

Second embodiment

Figure 3:
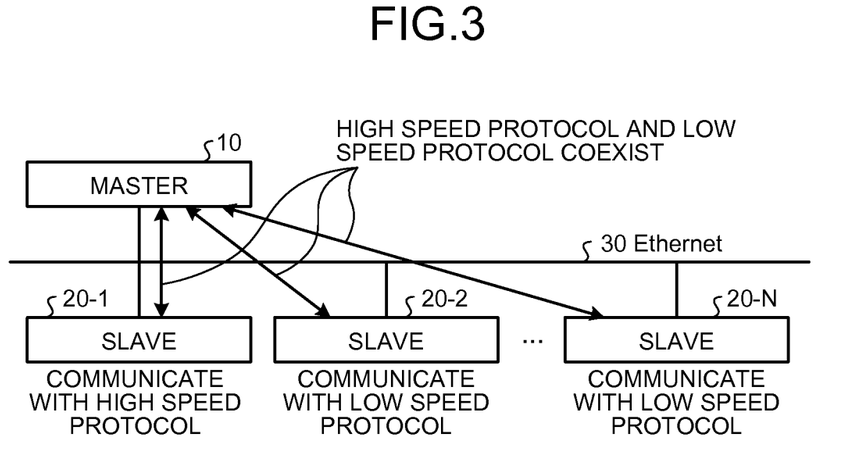
FIG. 3 is a diagram schematically illustrating an example of a configuration of an FA network system according to a second embodiment.

FIG. 3 is a diagram schematically illustrating an example of a configuration of an FA network system according to a second embodiment. Also in this FA network system, similar to the first embodiment, the master 10 and the slaves 20-1 to 20-N are connected via the transmission path (for example, the Ethernet®) 30. However, communication is performed on a high speed protocol between the slaves 20-1 and the master 10, while communication is performed on a low speed protocol between the slaves 20-2, . . ., 20-N and the master 10. That is, the second embodiment is different from the first embodiment in that both a high speed protocol and a low speed protocol are concurrently used in the communication between the master 10 and the slaves 20-1 to 20-N.

Figure 4:
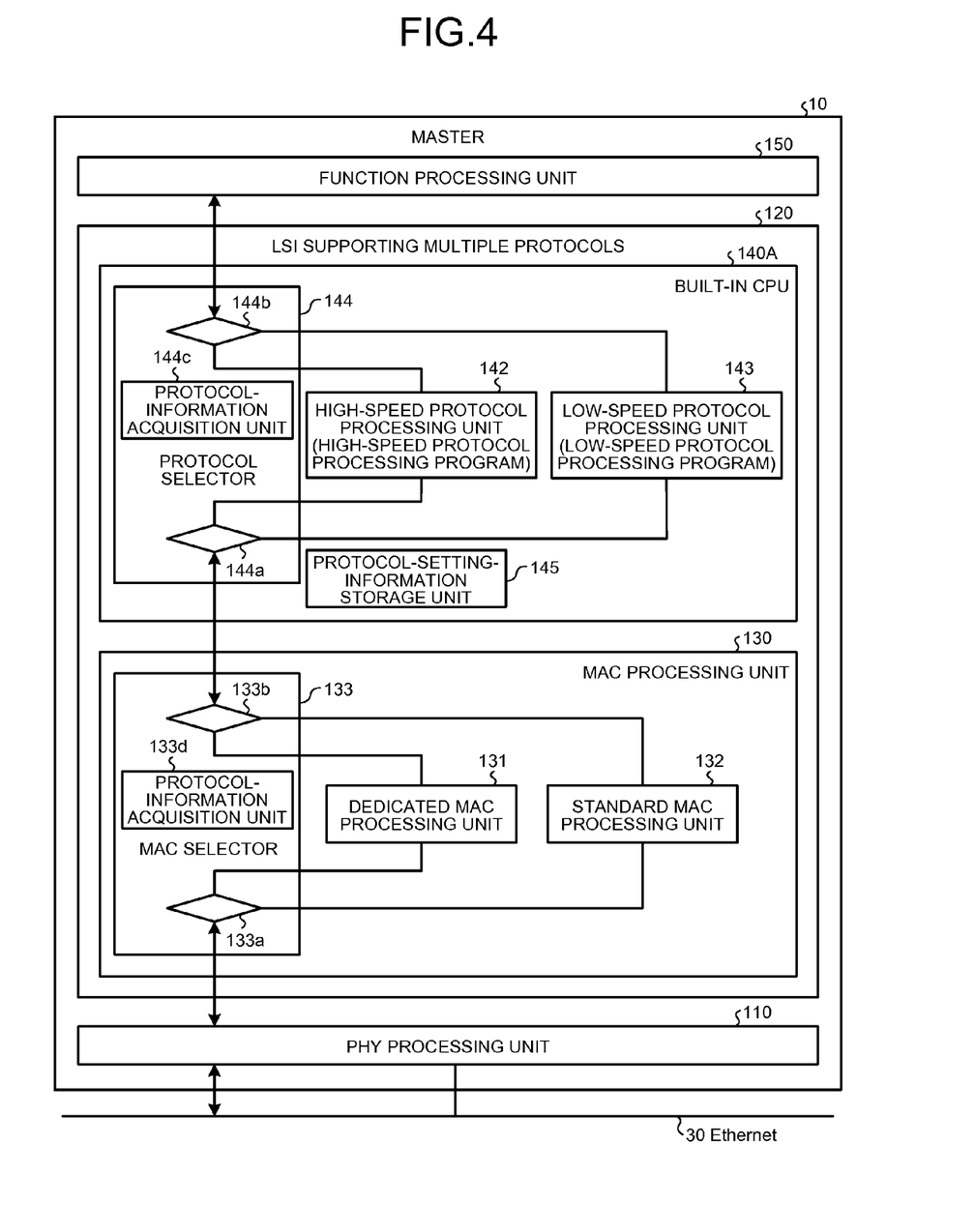
FIG. 4 is a block diagram schematically illustrating a configuration of a master according to the second embodiment.

FIG. 4 is a block diagram schematically illustrating a configuration of a master according to the second embodiment. The master 10 is different from that in the first embodiment in the configuration of a built-in CPU 140A in the LSI 120 supporting multiple protocols. That is, the built-in CPU 140A includes a high-speed protocol processing unit 142, which is a first protocol processing unit, that performs a high speed protocol process in a network layer or higher in accordance with a high-speed protocol processing program; a low-speed protocol processing unit 143, which is a second protocol processing unit, that performs a low speed protocol process in the network layer or higher in accordance with a low-speed protocol processing program; a protocol selector 144, which is a protocol-processing selection unit, that selects which one of the high-speed protocol processing unit 142 and the low-speed protocol processing unit 143 to use; and a protocol-setting-information storage unit 145 that stores therein protocol setting information related to a setting of a protocol switching process in transmission and reception of control data.

Figure 5:
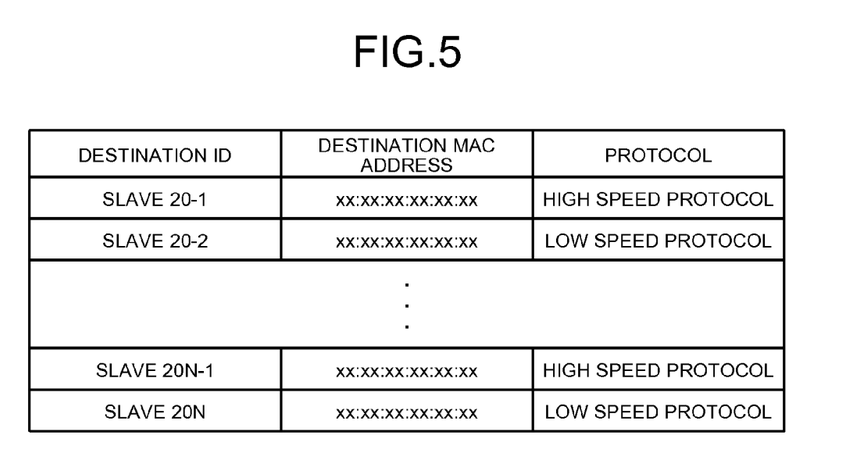
FIG. 5 is a diagram illustrating an example of protocol setting information.

FIG. 5 is a diagram illustrating an example of protocol setting information. The protocol setting information includes a destination ID, a destination MAC address, and a protocol. The destination ID is an identifier used when the function processing unit 150 specifies a destination slave 20, and it can be the number or the name thereof. The destination MAC address is used to determine the protocol to be used when receiving. The protocol specifies one used in the slave 20 specified by the destination ID or the destination MAC address (for example, a protocol used in the network layer or higher).

The protocol selector 144 includes a selector 144*a* provided on the side of the MAC processing unit 130, a selector 144*b* provided on the side of the function processing unit 150, and a protocol-information acquisition unit 144*c* that acquires the protocol from the protocol setting information for each piece of transmitted/received control data. More specifically, as for the control data received from the function processing unit 150, the protocol-information acquisition unit 144*c* acquires the protocol that matches the destination ID included in the control data from the protocol setting information; and the selector 144*b* performs selection according to the acquired protocol. As for the control data received from the MAC processing unit 130, the protocol-information acquisition unit 144*c* searches, in the protocol setting information, the destination MAC address that matches a source MAC address of the control data and acquires the protocol for which they match each other; and the selector 144*a* performs selection according to the acquired protocol.

The MAC selector 133 of the MAC processing unit 130 further includes a protocol-information acquisition unit 133*d* that acquires a protocol from the protocol setting information for each piece of transmitted/received control data. The process of selecting either one of the dedicated MAC processing unit 131 and the standard MAC processing unit 132 in the MAC selector 133 is identical to that in the protocol selector 144. However, in a case where the acquired protocol is the high speed protocol, the dedicated MAC processing unit 131 is selected; and in a case of the low speed protocol, the standard MAC processing unit 132 is selected.

Constituent elements equivalent to those in the first embodiment are denoted by the same reference signs and descriptions thereof will be omitted. In addition, the configurations of the slaves 20-1 to 20-N according to the second embodiment are same as those in the first embodiment.

Next, processes of transmitting and receiving control data in the communication device having the configuration described above are described with reference to FIG. 4.

(1) Transmission Process of Control Data

First, the control data that is a result of execution in the function processing unit 150 is sent to the protocol selector 144 of the built-in CPU 140A. At this time, the function processing unit 150 specifies a destination ID of a destination slave 20 according to the protocol setting information in the protocol-setting-information storage unit 145.

The protocol-information acquisition unit 144*c* of the protocol selector 144 then acquires the protocol corresponding to the destination ID from the protocol setting information in the protocol-setting-information storage unit 145; and the selectors 144*a* and 144*b* perform switching in accordance with the type of the acquired protocol. The protocol selector 144 then passes the control data to the high-speed protocol processing unit 142 or the low-speed protocol processing unit 143.

The high-speed protocol processing unit 142 or the low-speed protocol processing unit 143 then processes the control data in accordance with the protocol thereof, and thereafter sends the control data to the MAC processing unit 130. Subsequently, the protocol-information acquisition unit 133*d* of the MAC processing unit 130 acquires the protocol corresponding to the destination ID from the protocol setting information in the protocol-setting-information storage unit 145; and the selectors 133*a* and 133*b* perform switching in accordance with the type of the acquired protocol. In this case, when the protocol in the protocol setting information is the "high speed protocol", it is determined as the "dedicated MAC processing unit 131"; and when the protocol in the protocol setting information is the "low speed protocol", it is determined as the "standard MAC processing unit 132".

The MAC selector 133 then sends the control data to the dedicated MAC processing unit 131 or the standard MAC processing unit 132. The processing of the control data in the dedicated MAC processing unit 131 or the standard MAC processing unit 132 is identical to that in the first embodiment. That is, each of the dedicated MAC processing unit 131 and the standard MAC processing unit 132 processes the control data according to the Ethernet® standard that is defined in the dedicated MAC or the standard MAC, and sends the control data to the PHY processing unit 110. Finally, the PHY processing unit 110 transmits the control data to the transmission path 30 according to the Ethernet® standard.

(2) Reception Process of Control Data

First, upon reception of data through the transmission path 30, the PHY processing unit 110 sends the received control data to the MAC processing unit 130. The protocol-information acquisition unit 133*d* of the MAC processing unit 130 compares a source MAC address of the received control data and destination MAC addresses in the protocol setting information with each other, and acquires a protocol in a record having the destination MAC address that matches the source MAC address. The selectors 133*a* and 133*b* then perform switching in accordance with the type of the acquired protocol. In a case where the protocol in the protocol setting information is "high speed protocol", it is determined as the "dedicated MAC processing unit 131". In a case of "low speed protocol", it is determined as the "standard MAC processing unit 132". The MAC selector 133 then sends the control data to the dedicated MAC processing unit 131 or the standard MAC processing unit 132.

In a case where the selected MAC is the standard MAC processing unit 132, the standard MAC processing unit 132 checks a MAC address of the control data. When the MAC address is an address of its own station, the standard MAC processing unit 132 sends the control data to the low-speed protocol processing unit 143 of the built-in CPU 140A. When the MAC address is not the one of its own station, the standard MAC processing unit 132 discards the control data.

When the MAC address is a broadcast address or a multicast address, the standard MAC processing unit 132 sends the control data to the low-speed protocol processing unit 143 of the built-in CPU 140A.

Meanwhile, in a case where the selected MAC is the dedicated MAC processing unit 131, the dedicated MAC processing unit 131 checks the MAC address of the control data. When the MAC address is the one of its own station, the dedicated MAC processing unit 131 checks the control data, performs a process necessary for the high speed protocol; and when the control data is the one necessary for its own station, it sends the control data to the high-speed protocol processing unit 142 of the built-in CPU 140A. When the control data is not necessary for its own station, the dedicated MAC processing unit 131 discards the control data. When the MAC address is not the one of its own station, the dedicated MAC processing unit 131 also discards the control data.

When the control data is passed from the MAC processing unit 130 to the built-in CPU 140A, the protocol-information acquisition unit 144c of the protocol selector 144 compares the source MAC address of the received control data and destination MAC addresses in the protocol setting information with each other, and acquires a protocol of a record having the destination MAC address that matches the source MAC address. The selectors 144a and 144b then perform switching operation in accordance with the type of the acquired protocol. The protocol selector 144 then sends the control data to the high-speed protocol processing unit 142 or the low-speed protocol processing unit 143.

Subsequently, the high-speed protocol processing unit 142 or the low-speed protocol processing unit 143 processes the control data in accordance with the protocol thereof, and thereafter sends the control data to the function processing unit 150. The function processing unit 150 performs a predetermined process by using the control data.

In the second embodiment, the dedicated MAC processing unit 131 and the standard MAC processing unit 132, which are formed by H/W and which perform the protocol process in the data link layer, are provided and configured in such a manner that either one of the MAC processing units is selected by the MAC selector 133 in accordance with a MAC address of a communication counterpart of the control data to be processed. Further, the high-speed protocol processing unit 142 and the low-speed protocol processing unit 143, which are formed by S/W and which perform the protocol process in the network layer or higher, are provided and configured in such a manner that either one of the protocol processing units (protocol processing programs) is selected by the protocol selector 144 in accordance with the communication counterpart of the control data to be processed. Due to this configuration, even in a situation in which the slaves 20 using different protocols coexist in the transmission path 30, it is possible for the master 10 to dynamically handle the processes on the respective protocols with a single LSI 120 that supports multiple protocols.

Furthermore, because a plurality of protocols (a high speed protocol and a low speed protocol) can coexist in the same transmission path 30, communication devices supporting the respective protocols can be used without specific modification. That is, it is possible to connect various types of devices to the transmission path 30. Further, it is possible to omit a gateway performing protocol conversion for allowing the low speed protocol to pass through the high speed protocol or a device that encapsulates and passes data of one of the protocols. Furthermore, because switching between the dedicated MAC processing unit 131 and the standard MAC processing unit 132 always occurs in the processes of transmitting and receiving control data, it is possible to increase the switching speed by having the MAC selector 133 built in the MAC processing unit 130.

Third Embodiment

Figure 6:
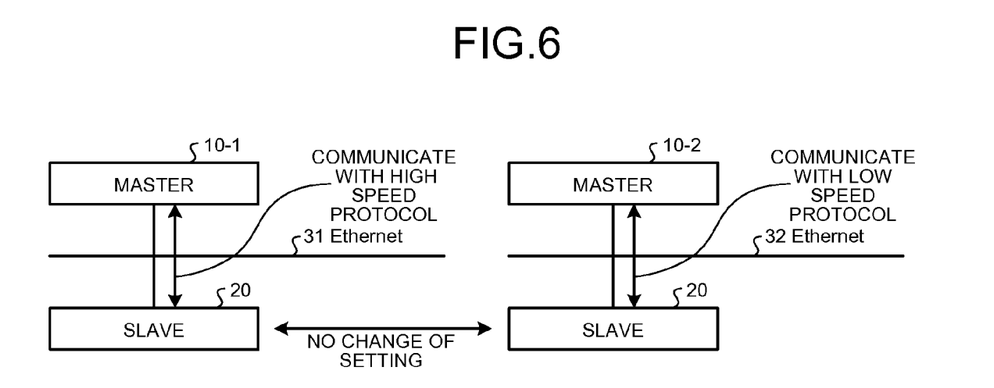
FIG. 6 is a diagram schematically illustrating an example of a configuration of an FA network system according to a third embodiment.

FIG. 6 is a diagram schematically illustrating an example of a configuration of an FA network system according to a third embodiment. FIG. 6 illustrates a case where a first network, in which a master 10-1 and the slave 20 that perform communication through a high speed protocol are connected via a transmission path 31 (for example, the Ethernet®) and a second network, in which a master 10-2 and the slave 20 that perform communication through a low speed protocol are connected via a transmission path 32 (for example, the Ethernet®) are provided separately from each other. Other slaves are also connected to the first network and the second network.

The third embodiment describes the slave 20 that does not need any setting of a change of a protocol in a case where the slave 20 is moved to a network in which communication is performed through a different protocol. That is, this is such a case as moving the slave 20 connected to the first network to the second network.

Figure 7:
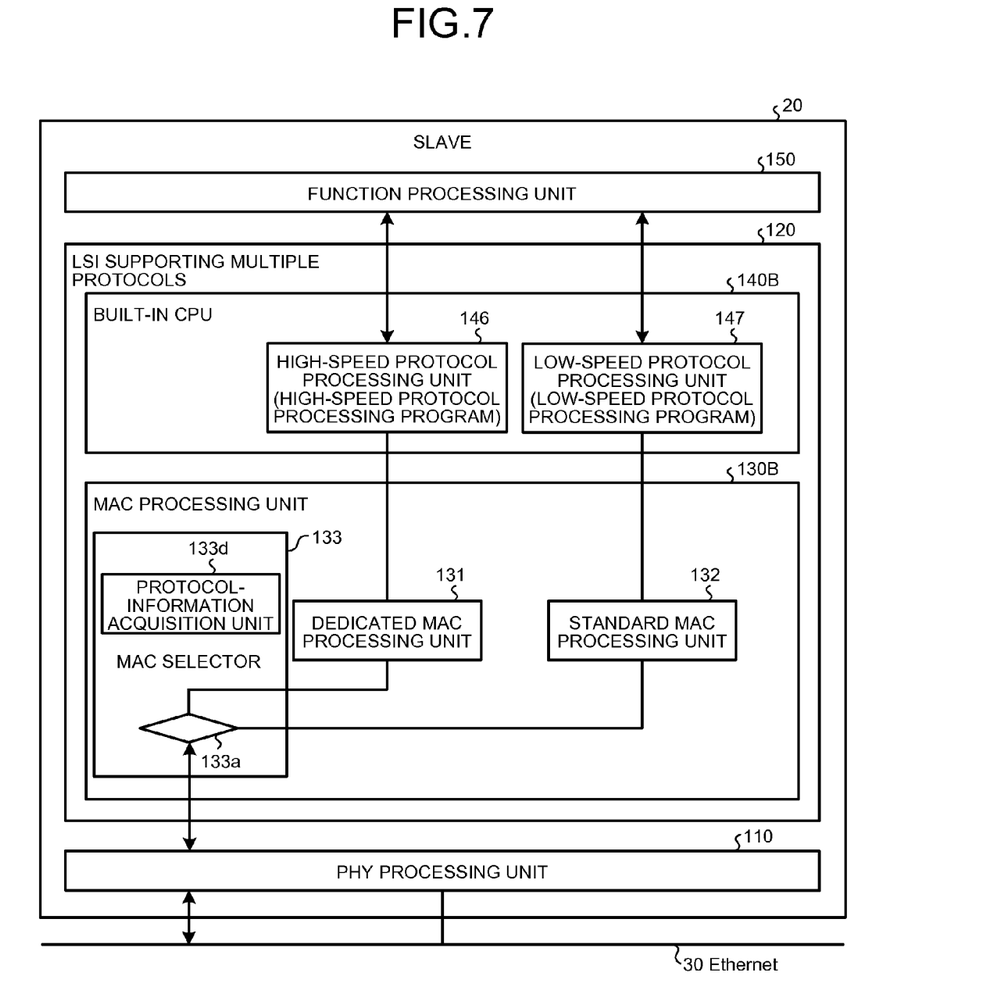
FIG. 7 is a block diagram schematically illustrating a configuration of a slave according to the third embodiment.

FIG. 7 is a block diagram schematically illustrating a configuration of a slave according to the third embodiment. The slave 20 is different from that in the first embodiment in a configuration of a MAC processing unit 130B and a configuration of a built-in CPU 140B in the LSI 120 that support multiple protocols.

The built-in CPU 140B includes a high-speed protocol processing unit 146 as a first protocol processing unit that performs a high-speed protocol process in a network layer or higher in accordance with a high-speed protocol processing program; and a low-speed protocol processing unit 147 as a second protocol processing unit that performs a low-speed protocol process in the network layer or higher in accordance with a low-speed protocol processing program.

In the MAC selector 133 of the MAC processing unit 130B, only the selector 133a on the side of the PHY processing unit 110 is positioned, and no selector is positioned on the side of the built-in CPU 140B. Therefore, the dedicated MAC processing unit 131 is associated with (connected to) the high-speed protocol processing unit 146 of the built-in CPU 140B; and the standard MAC processing unit 132 is associated with (connected to) the low-speed protocol processing unit 147 of the built-in CPU 140B.

The MAC selector 133 further includes the protocol-information acquisition unit 133d as a protocol-specifying-information acquisition unit that, when the slave 20 has received control data from the master 10 for the first time after being connected to a current network, checks EtherType included in the control data to acquire a type of a protocol.

The selector 133a of the MAC selector 133 performs switching in accordance with the type of the protocol acquired in the protocol-information acquisition unit 133d. For example, when the acquired type of the protocol is 0x0800 (IPv4) or the type of the low speed protocol, the selector 133a switches to the standard MAC processing unit 132. When the type of protocol acquired is high speed protocol type, the selector 133a switches to the dedicated MAC processing unit 131. This switching is performed only when the first control data is received, and thereafter the switching by the MAC selector 133 is not performed even when the control data is received.

Constituent elements equivalent to those in the first embodiment are denoted by like reference signs and descriptions thereof will be omitted. In addition, the configuration of the master 10 according to the third embodiment is same as that in the first or second embodiment.

Next, processes of transmitting and receiving control data in the communication device having the configuration described above are described with reference to FIG. 7.

(1) Reception Process of Control Data

After the slave 20 is connected to a network in which processing is performed through a high speed protocol or a low speed protocol, and when the PHY processing unit 110 receives control data from the transmission path 31 or 32 for the first time, the received control data is sent to the MAC processing unit 130B. The protocol-information acquisition unit 133d of the MAC processing unit 130B determines whether a protocol type of the control data is the type of the low speed protocol or the type of the high speed protocol from EtherType of the control data; and the selector 133a performs switching on the basis of the result of the acquired type of the protocol. The selector 133a switches to the dedicated MAC processing unit 131 in a case of the high speed protocol, and switches to the standard MAC processing unit 132 in a case of the low speed protocol. The MAC selector 133 then sends the control data to the dedicated MAC processing unit 131 or the standard MAC processing unit 132 that is selected.

In a case where the selected MAC is the standard MAC processing unit 132, the standard MAC processing unit 132 checks a MAC address of the control data. When the MAC address is an address of its own station, the standard MAC processing unit 132 sends the control data to the low-speed protocol processing unit 147 associated therewith in advance. When the MAC address is not the address of its own station, the standard MAC processing unit 132 discards the control data. Also, when the MAC address is a broadcast address or a multicast address, the standard MAC processing unit 132 sends the control data to the low-speed protocol processing unit 147. The low-speed protocol processing unit 147 performs the protocol process that is needed based on a low-speed protocol processing program, and sends the control data to the function processing unit 150.

Meanwhile, in a case where the selected MAC is the dedicated MAC processing unit 131, the dedicated MAC processing unit 131 checks the MAC address of the control data. When the MAC address is the address of its own station, the dedicated MAC processing unit 131 checks the control data, performs a process needed for the high speed protocol; and when the control data is necessary for its own station, it sends the control data to the high-speed protocol processing unit 146 that is associated with the dedicated MAC processing unit 131 in advance. When the control data is not needed for its own station, the dedicated MAC processing unit 131 discards the control data. Also, when the MAC address is not the address of its own station, the dedicated MAC processing unit 131 discards the control data. The high-speed protocol processing unit 146 performs a necessary protocol process based on a high-speed protocol processing program, and it sends the control data to the function processing unit 150.

The switching by the selector 133a is performed when the slave 20 is connected to the transmission path for the first time, and thereafter the selector 133a is fixed. Therefore, when the control data is received for the second time or later, the above switching by the selector 133a is not performed and the control data is sent to a direction set by the selector 133a of the MAC selector 133.

(2) Transmission Process of Control Data

The function processing unit 150 carries out a predetermined function according to the received control data, and sends control data that is a result of carrying out the function to the high-speed protocol processing unit 146 or the low-speed protocol processing unit 147 that has sent the control data.

The high-speed protocol processing unit 146 or the low-speed protocol processing unit 147 performs a protocol process of the control data in accordance with a high-speed protocol processing program or a low-speed protocol processing program. Subsequently, the high-speed protocol processing unit 146 or the low-speed protocol processing unit 147 sends the control data to the dedicated MAC processing unit 131 or the standard MAC processing unit 132 of the MAC processing unit 130B that is associated therewith.

The dedicated MAC processing unit 131 or the standard MAC processing unit 132 then processes the control data according to the Ethernet® standard defined in the dedicated MAC or the standard MAC thereof, and it sends the control data to the PHY processing unit 110. Finally, the PHY processing unit 110 transmits the control data to the transmission path 31 or 32 according to the Ethernet® standard.

In the third embodiment, the dedicated MAC processing unit 131 and the standard MAC processing unit 132, which are formed by H/W and perform the protocol process in the data link layer, are provided in the MAC processing unit 130B and are configured in such a manner that either of the MAC processing units is selected on the basis of the information indicating the protocol type included in the first control data received from the master 10 after having been connected to the transmission path 31 or 32. Further, the high-speed protocol processing unit 146 and the low-speed protocol processing unit 147, which are formed by S/W and perform the protocol process in the network layer or higher, are provided to be associated with the dedicated MAC processing unit 131 and the standard MAC processing unit 132, respectively. Due to this configuration, either of the dedicated MAC processing unit 131 and the standard MAC processing unit 132 is selected automatically according to the first received control data. Also, because the selected MAC processing unit and the protocol processing unit (the protocol processing program) are associated with each other in advance, the protocol processing unit is automatically selected. As a result, as for the slave 20, it is possible to statically handle both the high speed protocol and the low speed protocol by providing a single LSI 120 that supports multiple protocols without any setting by a user.

While descriptions are made as an example above for a case where Ethernet® is used as a data link layer, the present invention is not limited thereto.

INDUSTRIAL APPLICABILITY

As described above, the FA network LSI according to the present invention is useful in a communication device that is used under an environment where a plurality of protocols may be used.

REFERENCE SIGNS LIST 10 master, 20 slave, 30 to 32 transmission path, 110 PHY processing unit, 120 LSI supporting multiple protocols, 130, 130B MAC processing unit, 131 dedicated MAC processing unit, 132 standard MAC processing unit, 133 MAC selector, 133a, 133b, 144a, 144b selector, 133d, 144c protocol-information acquisition unit, 134 selection-information confirmation unit, 140, 140A, 140B built-in CPU, 141 protocol processing unit, 142, 146 high-speed protocol processing unit, 143, 147 low-speed protocol processing unit, 144 protocol selector, 145 protocol-setting-information storage unit, 150 function processing unit.

The invention claimed is:

1. An FA network LSI used in an FA system in which a plurality of communication devices are connected via a network, incorporated in the communication device capable of performing a communication process on a network layer or higher via a plurality of protocols, and formed in one chip, the FA network LSI comprising:
 a data-link layer processor that performs a process on a data link layer for control data communicated with the network;
 a protocol processor that performs a process on a network layer or higher for the control data; and
 a protocol-setting-information storage unit that stores therein protocol setting information in which communication-device identification information and a MAC address that are assigned to a communication device of a communication counterpart and a type of a protocol to be used in the communication device of the communication counterpart are associated with each other, wherein
 the data-link layer processor includes
 a first data-link layer processor that performs a first data-link layer process on the data link layer defined dedicatedly to correspond to a protocol for which high speed processing is required,
 a second data-link layer processor that performs a second data-link layer process on a standard data link layer for a protocol other than the protocol for which the high speed processing is required,
 a data-link-layer-processing selector that includes
 a first selector that selects one of the first data-link layer processor and the second data-link layer processor in accordance with a predetermined criterion for transmitted control data and is positioned on a side of the protocol processor, and
 a second selector that selects one of the first data-link layer processor and the second data-link layer processor in accordance with a predetermined criterion for received control data and is positioned on a side of the network,
 a first protocol-information acquisitioner that acquires a protocol, associated with communication-device identification information or a MAC address of the communication device of the communication counterpart included in the control data, from the protocol setting information,
 the data-link layer processor is formed by hardware,
 the first protocol-information acquisitioner acquires, when control data is transmitted, from the protocol setting information, a protocol corresponding to the communication-device identification information at a transmission destination of control data to be transmitted,
 the first protocol-information acquisitioner acquires, when control data is received, from the protocol setting information, a protocol corresponding to a transmission source MAC address of received control data, and
 the first selector and the second selector select one of the first data-link layer processor and the second data-link layer processor in accordance with the protocol acquired in the first protocol-information acquisitioner.

2. The FA network LSI according to claim 1, wherein
 the data-link layer processor further includes a selection-information confirmer that, when the communication device provided therein with the FA network LSI is activated, acquires selection information that defines which one of the first data-link layer processor and the second data-link layer processor is to be performed, and
 the data-link-layer-processing selector selects one of the first data-link layer processor and the second data-link layer processor according to the selection information that is acquired.

3. The FA network LSI according to claim 2, wherein
 the data-link-layer-processing selector is provided therein with selectors on a side of the network and a side of the protocol processor, respectively.

4. The FA network LSI according to claim 1, wherein
 the protocol processor includes
 a first protocol processor that processes the control data through a protocol for which the high speed processing is required,
 a second protocol processor that processes the control data through the protocol other than the protocol for which the high speed processing is required,
 a second protocol-information acquisitioner that acquires a protocol, associated with the communication-device identification information or the MAC address of the communication device of the communication counterpart included in the control data, from the protocol setting information, and
 a protocol-processing selector that selects one of the first protocol processor and the second protocol processor in accordance with the protocol acquired in the second protocol-information acquisitioner, for each piece of transmitted control data or each piece of received control data.

5. The FA network LSI according to claim 4, wherein
 the protocol-processing selector is a first selector provided on a side of the data-link layer processor and a second selector provided on a side of a function processor that performs a predetermined function process performed by the communication device in which the FA network LSI is provided, and
 the data-link-layer-processing selector is a third selector provided on a side of the network and a fourth selector provided on a side of the protocol processor.

6. The FA network LSI according to claim 1, wherein
 the protocol processor includes
 a first protocol processor that processes the control data thorough a protocol for which the high speed processing is needed, and
 a second protocol processor that processes the control data through a protocol other than the protocol for which the high speed processing is needed,
 the data-link layer processor further includes
 a protocol-specifying-information acquisitioner that acquires protocol-specifying information that specifies a protocol included in the control data received from a communication device of a communication counterpart, when receiving the control data received from the communication device of the communication counterpart for a first time after the communication device provided therein with the FA network LSI is connected to the network,
 the first data-link layer processor is associated with the first protocol processor,
 the second data-link layer processor is associated with the second protocol processor, and the data-link-layer-processing selector selects one of the first data-link layer processor and the second data-link layer processor according to the acquired protocol-specifying information.

7. The FA network LSI according to claim 6, wherein the data-link-layer-processing selector is a selector provided only on a side of the network.

8. A communication device used in an FA system in which a plurality of communication devices are connected via a network, and capable of performing a communication process on a network layer or higher through a plurality of protocols, the communication device comprising:
   a physical-layer processor that performs a process on a physical layer for control data with the network;
   a function processor that performs a predetermined process using the control data; and
   an FA network LSI that is provided between the physical-layer processor and the function processor so as to perform a process on a data link layer and a process on the network layer or higher for the control data, and is formed in one chip, wherein
   the FA network LSI includes
   a data-link layer processor that performs the process on the data link layer for the control data,
   a protocol processor that performs the process on the network layer or higher for the control data, and
   a protocol-setting-information storage unit that stores therein protocol setting information in which communication-device identification information and a MAC address that are assigned to a communication device of a communication counterpart and a type of a protocol to be used in the communication device of the communication counterpart are associated with each other, wherein
   the data-link layer processor includes
   a first data-link layer processor that performs a first data-link layer process on the data link layer defined dedicatedly to correspond to a protocol for which high speed processing is required,
   a second data-link layer processor that performs a second data-link layer process on a standard data link layer for a protocol other than the protocol for which the high speed processing is required, and
   a data-link-layer-processing selector that includes
   a first selector that selects one of the first data-link layer processor and the second data- link layer processor in accordance with a predetermined criterion for transmitted control data and is positioned on a side of the protocol processor, and
   a second selector that selects one of the first data-link layer processor and the second data-link layer processor in accordance with a predetermined criterion for received control data and is positioned on a side of the network, and
   a first protocol-information acquisitioner that acquires a protocol, associated with communication-device identification information or a MAC address of the communication device of the communication counterpart included in the control data, from the protocol setting information,
   the data-link layer processor is formed by hardware,
   the first protocol-information acquisitioner acquires, when control data is transmitted, from the protocol setting information, a protocol corresponding to the communication-device identification information at a transmission destination of control data to be transmitted, and the first protocol-information acquisitioner acquires, when control data is received, from the protocol setting information, a protocol corresponding to a transmission source MAC address of received control data, and
   the first selector and the second selector select one of the first data-link layer processor and the second data-link layer processor in accordance with the protocol acquired in the first protocol-information acquisitioner.

9. The communication device according to claim 8, wherein
   the data-link layer processor of the FA network LSI further includes a selection-information confirmer that, when the communication device provided therein with the FA network LSI is activated, acquires selection information that defines which one of the first data-link layer processor and the second data-link layer processor is to be performed, and
   the data-link-layer-processing selector selects one of the first data-link layer processor and the second data-link layer processor according to the selection information that is acquired.

10. The communication device according to claim 9, wherein
    the data-link-layer-processing selector of the FA network LSI is provided therein with selectors on a side of the network and a side of the protocol processor, respectively.

11. The communication device according to claim 8, wherein
    the protocol processor of the FA network LSI includes
    a first protocol processor that processes the control data through a protocol for which the high speed processing is required,
    a second protocol processor that processes the control data through the protocol other than the protocol for which the high speed processing is required,
    a second protocol-information acquisitioner that acquires a protocol, associated with the communication-device identification information or the MAC address of the communication device of the communication counterpart included in the control data, from the protocol setting information, and
    a protocol-processing selector that selects one of the first protocol processor and the second protocol processor in accordance with the protocol acquired in the second protocol- information acquisitioner, for each piece of transmitted control data or each piece of received control data.

12. The communication device according to claim 11, wherein
    the protocol-processing selector of the FA network LSI is a first selector provided on a side of the data-link layer processor and a second selector provided on a side of a function processor that performs a predetermined function process performed by the communication device in which the FA network LSI is provided, and
    the data-link-layer-processing selector of the FA network LSI is a third selector provided on a side of the network and a fourth selector provided on a side of the protocol processor.

13. The communication device according to claim 8, wherein
    the protocol processor of the FA network LSI includes
    a first protocol processor that processes the control data thorough a protocol for which the high speed processing is needed, and a second protocol processor that processes the control data through a protocol other than the protocol for which the high speed processing is needed, the data-link layer processor of the FA network LSI further includes a protocol-specifying-information acquisitioner that acquires protocol-specifying information that specifies a protocol included in the control data received from a communication device of a communication counterpart, when receiving the control data received from the communication device of the communication counterpart for a first time after the communication device provided therein with the FA network LSI is connected to the network, the first data-link layer processor of the FA network LSI is associated with the first protocol processor, the second data-link layer processor of the FA network LSI is associated with the second protocol processor, and the data-link-layer-processing selector of the FA network LSI selects one of the first data-link layer processor and the second data-link layer processor according to the acquired protocol-specifying information.

14. The communication device according to claim 13, wherein the data-link-layer-processing selector of the FA network LSI is a selector provided only on a side of the network.

* * * * *